US012625886B2

(12) United States Patent
Beltran et al.

(10) Patent No.: US 12,625,886 B2
(45) Date of Patent: May 12, 2026

(54) METHOD AND SYSTEM FOR AUTOMATIC DATA CLUSTERING

(71) Applicant: JPMorgan Chase Bank, N.A., New York, NY (US)

(72) Inventors: Maria Beltran, Chicago, IL (US); Evelyn Delph, Chicago, IL (US); Karen Somes, Grapevine, TX (US); Trupti Jadhav, Secaucus, NJ (US); Naman Sethi, Panipat (IN); Ian Coldren, Lewis Center, OH (US); Danielle Wang, Chicago, IL (US); Sparsh Srivastava, Lucknow (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/519,660

(22) Filed: Nov. 27, 2023

(65) Prior Publication Data

US 2025/0124053 A1    Apr. 17, 2025

(30)        Foreign Application Priority Data

Oct. 13, 2023    (IN) ............................. 202311069096

(51) Int. Cl.
    *G06F 16/00*        (2019.01)
    *G06F 16/2457*      (2019.01)
    *G06F 16/28*        (2019.01)
(52) U.S. Cl.
    CPC ...... *G06F 16/285* (2019.01); *G06F 16/24573* (2019.01)

(58) Field of Classification Search
    None
    See application file for complete search history.

(56) References Cited

U.S. PATENT DOCUMENTS

| 10,394,691 | B1 * | 8/2019 | Cole | G06F 11/079 |
| 2007/0185867 | A1 * | 8/2007 | Maga | G06Q 30/02 |
| 2018/0268298 | A1 * | 9/2018 | Johansen | G06N 3/084 |
| 2022/0342583 | A1 * | 10/2022 | Scott | G06F 40/30 |
| 2023/0112096 | A1 * | 4/2023 | Choi | G06F 16/285 |
|  |  |  |  | 707/737 |
| 2023/0394361 | A1 * | 12/2023 | Chua | G06N 20/20 |
| 2024/0160850 | A1 * | 5/2024 | Hoots | G06F 16/345 |
| 2024/0176950 | A1 * | 5/2024 | Rani | G06Q 30/0282 |

* cited by examiner

*Primary Examiner* — Anhtai V Tran
(74) *Attorney, Agent, or Firm* — GREENBLUM & BERNSTEIN, P.L.C.

(57)        ABSTRACT

A method for using machine learning models to automatically cluster data into meaningful populations and groups and to identify hidden patterns and structures in such data is provided. The method includes: receiving first information that relates to a group of entities; analyzing the first information with respect to a predetermined set of parameters and a predetermined set of data types; selecting, based on a result of the analysis, a first machine learning (ML) model from among a predetermined set of ML models; and using the selected first ML model to generate a report that includes second information that relates to at least one data cluster identified by the first ML model from the first information.

15 Claims, 4 Drawing Sheets

400

Receive Entity-Specific Information re Group of Entities
S402

Analyze Entity-Specific Information re Parameters and Data Types
S404

For Textual Data, Perform Sentiment Analysis and/or Topic Modeling Analysis to Identify Keywords
S406

Select an Artificial Intelligence (AI) / Machine Learning (ML) Model and/or Algorithm Based on Silhouette Score
S408

Apply Selected AI/ML Model/Algorithm to Generate Report re Identified Data Clusters
S410

100

102

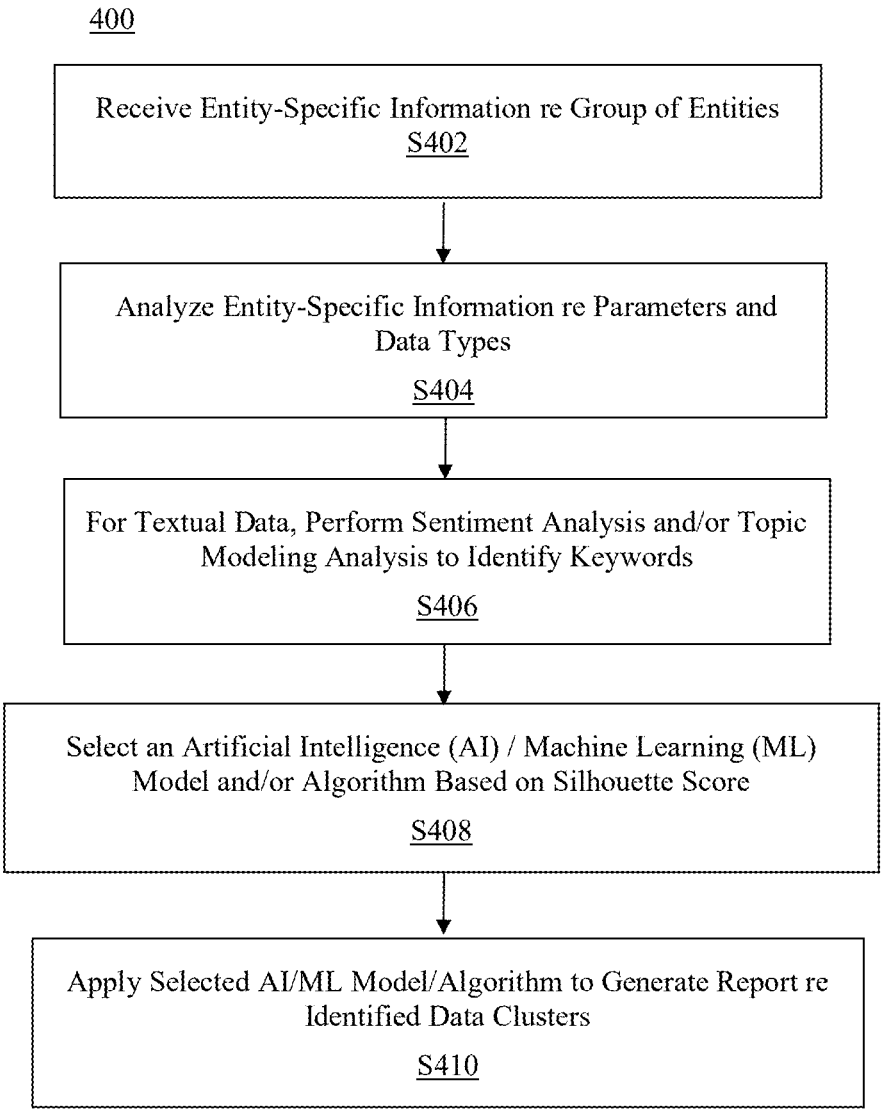

400

Receive Entity-Specific Information re Group of Entities
S402

Analyze Entity-Specific Information re Parameters and
Data Types
S404

For Textual Data, Perform Sentiment Analysis and/or Topic
Modeling Analysis to Identify Keywords
S406

Select an Artificial Intelligence (AI) / Machine Learning (ML)
Model and/or Algorithm Based on Silhouette Score
S408

Apply Selected AI/ML Model/Algorithm to Generate Report re
Identified Data Clusters
S410

FIG. 4

METHOD AND SYSTEM FOR AUTOMATIC DATA CLUSTERING

CROSS-REFERENCE TO RELATED APPLICATIONS

This application claims priority benefit from Indian Application No. 202311069096, filed Oct. 13, 2023 in the India Patent Office, which is hereby incorporated by reference in its entirety.

BACKGROUND

1. Field of the Disclosure

This technology generally relates to methods and systems for organizing and clustering data, and more particularly to methods and systems for using machine learning models to automatically cluster data into meaningful populations and groups and to identify hidden patterns and structures in such data.

2. Background Information

In a large institution that serves many clients, such as a financial institution or a bank, large amounts of data are generated and received on a daily basis. The sheer volume of the data often leads to questions about the make-up of the data, such as what groups and/or sub-groups and behaviors are present within the data. To answer such questions, the institution may rely on data scientists to conduct advanced analysis. A typical data science workflow would include steps of data preparation, feature engineering, model tuning, model selection, and model evaluation. However, such analysis generally requires significant expertise, and may also be quite time-consuming. As a result, there is a relatively high cost with respect to both time and resources to obtain important insights into the make-up of the data.

Accordingly, there is a need for a mechanism for using machine learning models to automatically cluster data into meaningful populations and groups and to identify hidden patterns and structures in such data.

SUMMARY

The present disclosure, through one or more of its various aspects, embodiments, and/or specific features or sub-components, provides, inter alia, various systems, servers, devices, methods, media, programs, and platforms for methods and systems using machine learning models to automatically cluster data into meaningful populations and groups and to identify hidden patterns and structures in such data.

According to an aspect of the present disclosure, a method for clustering data is provided. The method is implemented by at least one processor. The method includes: receiving, by the at least one processor, first information that relates to a first plurality of entities; analyzing, by the at least one processor, the first information with respect to a predetermined set of parameters and a predetermined set of data types; selecting, by the at least one processor based on a result of the analyzing, a particular machine learning (ML) model from among a predetermined plurality of ML models; and generating, by the at least one processor by using the particular ML model, a first report that includes second information that relates to at least one data cluster identified by the particular ML model from the first information.

The predetermined plurality of ML models may include at least one from among a first model that implements a hierarchical clustering algorithm, a second model that implements a database scan (DBSCAN) algorithm, a third model that implements a K-means algorithm, and a fourth model that implements a K-prototypes algorithm.

The first information may include a first dataset that is in a comma-separated values (CSV) format.

The first dataset may be received as an input Microsoft Excel file.

The predetermined set of data types may include at least one from among a numerical data type, an ordinal data type, a nominal data type, a categorical data type, and a textual data type.

For textual data within the first information, the analyzing may include performing a sentiment analysis that assigns, for each analyzed portion of the textual data, at least one from among a positive sentiment, a negative sentiment, and a neutral sentiment.

For textual data exceeding 50 characters within the first information, the analyzing may include performing a topic modeling operation by which at least one keyword is identified.

The at least one data cluster may include at least one from among a first data cluster that relates to a first plurality of clients that is associated with a first line of business (LOB), a first industry sector, and relatively low revenue values; a second data cluster that relates to a second plurality of clients that is associated with a second LOB, a second industry sector, and mid-range revenue values; and a third data cluster that relates to a third plurality of clients that is associated with a third LOB, a third industry sector, and relatively high revenue values.

The selecting may include determining, for each respective one from among the predetermined plurality of ML models, a corresponding silhouette score that relates to a respective cluster quality for clusters generated by the respective ML model.

According to another exemplary embodiment, a computing apparatus for clustering data is provided. The computing apparatus includes a processor; a memory; and a communication interface coupled to each of the processor and the memory. The processor is configured to: receive, via the communication interface, first information that relates to a first plurality of entities; analyze the first information with respect to a predetermined set of parameters and a predetermined set of data types; select, based on a result of the analysis, a particular ML model from among a predetermined plurality of ML models; and generate, by using the particular ML model, a first report that includes second information that relates to at least one data cluster identified by the particular ML model from the first information.

The predetermined plurality of ML models may include at least one from among a first model that implements a hierarchical clustering algorithm, a second model that implements a database scan (DBSCAN) algorithm, a third model that implements a K-means algorithm, and a fourth model that implements a K-prototypes algorithm.

The first information may include a first dataset that is in a comma-separated values (CSV) format.

The first dataset may be received as an input Microsoft Excel file.

The predetermined set of data types may include at least one from among a numerical data type, an ordinal data type, a nominal data type, a categorical data type, and a textual data type.

For textual data within the first information, the processor may be further configured to perform a sentiment analysis that assigns, for each analyzed portion of the textual data, at least one from among a positive sentiment, a negative sentiment, and a neutral sentiment.

For textual data exceeding 50 characters within the first information, the processor may be further configured to perform a topic modeling operation by which at least one keyword is identified.

The at least one data cluster may include at least one from among a first data cluster that relates to a first plurality of clients that is associated with a first line of business (LOB), a first industry sector, and relatively low revenue values; a second data cluster that relates to a second plurality of clients that is associated with a second LOB, a second industry sector, and mid-range revenue values; and a third data cluster that relates to a third plurality of clients that is associated with a third LOB, a third industry sector, and relatively high revenue values.

The processor may be further configured to make the selection by determining, for each respective one from among the predetermined plurality of ML models, a corresponding silhouette score that relates to a respective cluster quality for clusters generated by the respective ML model.

According to yet another exemplary embodiment, a non-transitory computer readable storage medium storing instructions for clustering data is provided. The storage medium includes a second set of executable code which, when executed by a processor, causes the processor to: receive first information that relates to a first plurality of entities; analyze the first information with respect to a predetermined set of parameters and a predetermined set of data types; select, based on a result of the analysis, a particular ML model from among a predetermined plurality of ML models; and generate, by using the particular ML model, a first report that includes second information that relates to at least one data cluster identified by the particular ML model from the first information.

The predetermined plurality of ML models may include at least one from among a first model that implements a hierarchical clustering algorithm, a second model that implements a database scan (DBSCAN) algorithm, a third model that implements a K-means algorithm, and a fourth model that implements a K-prototypes algorithm.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for using an artificial intelligence technique to forecast market activities by specific parties with respect to derivatives and other specific types of financial instruments.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
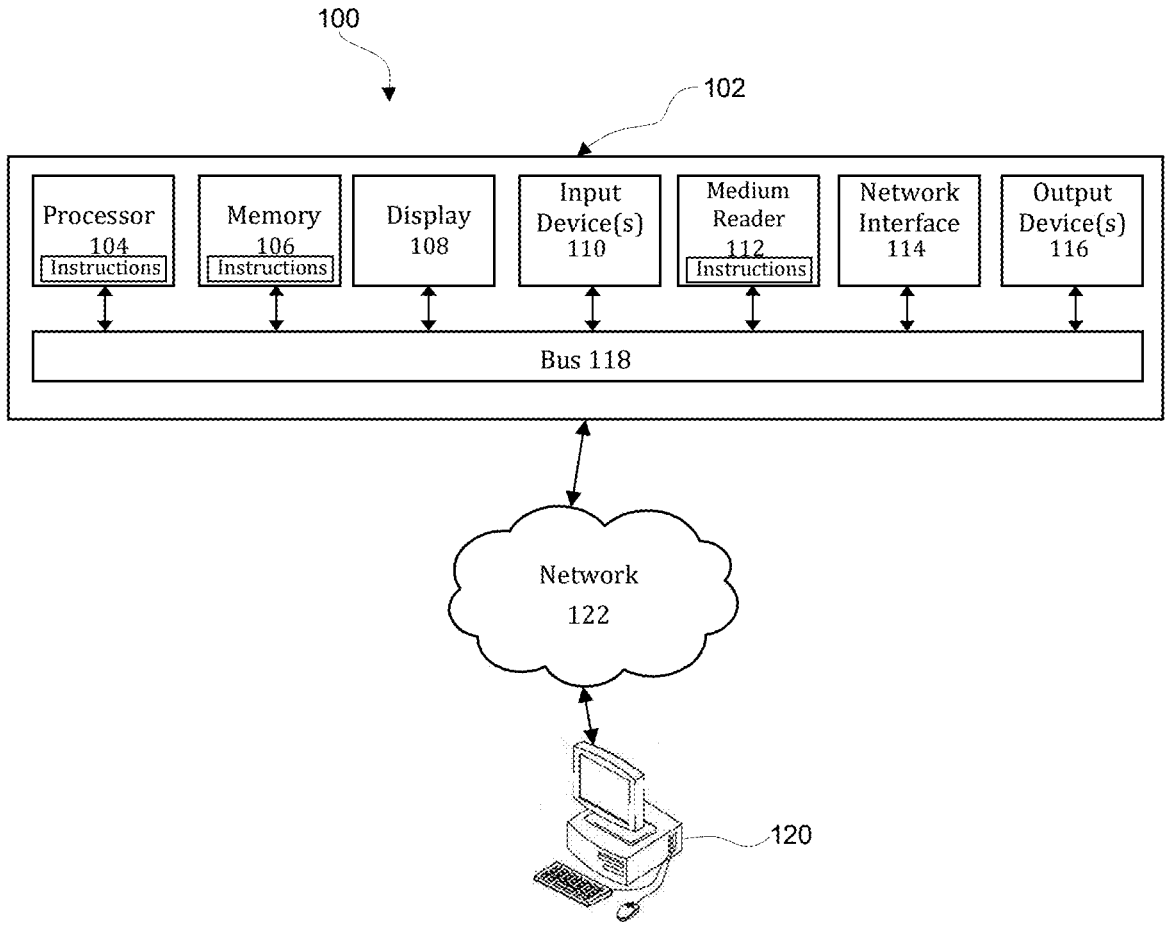
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using machine learning models to automatically cluster data into meaningful populations and groups and to identify hidden patterns and structures in such data.

Figure 2:
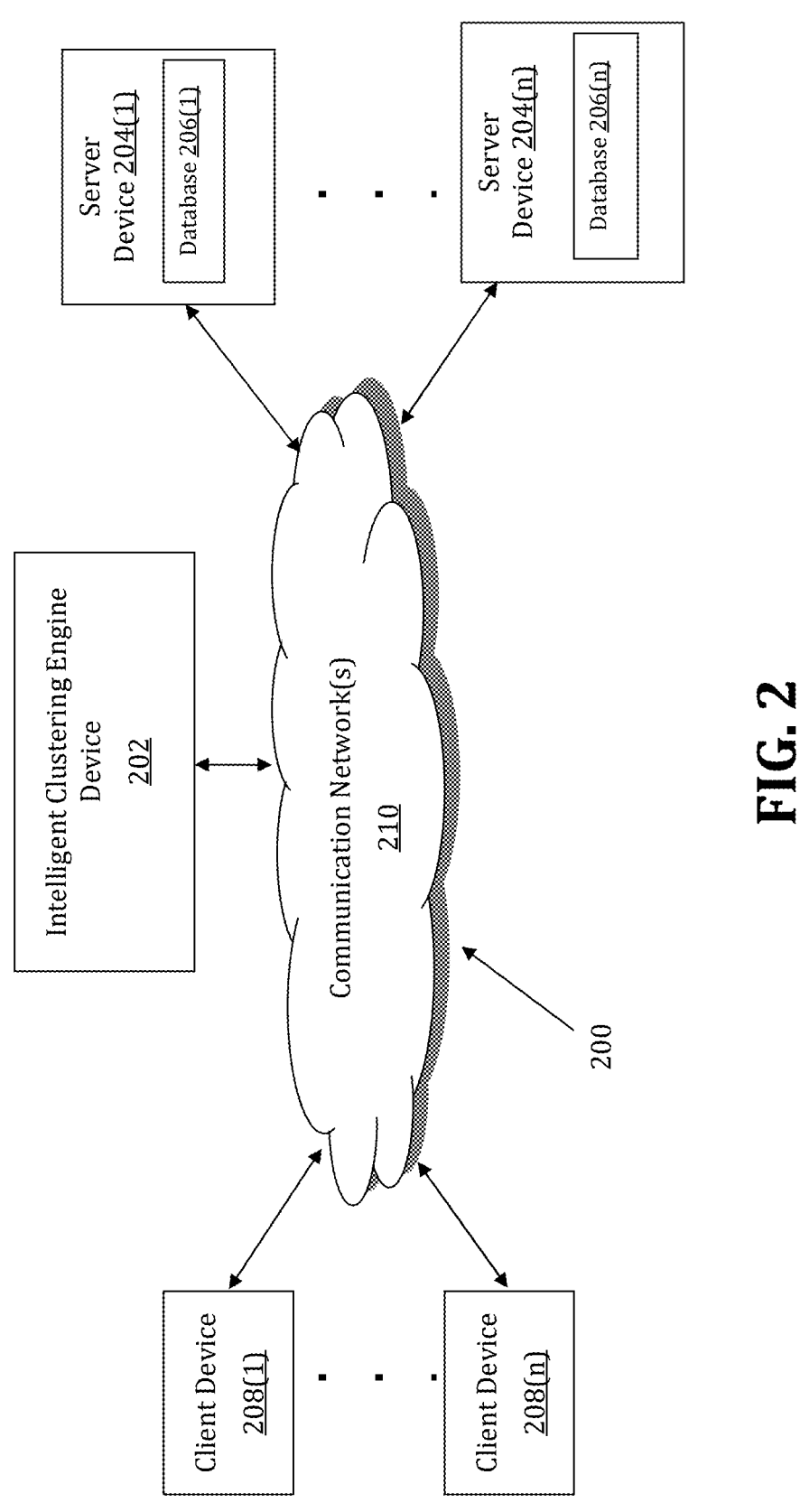
FIG. 2 illustrates an exemplary diagram of a network environment.

Referring to FIG. 2, a schematic of an exemplary network environment 200 for implementing a method for using machine learning models to automatically cluster data into meaningful populations and groups and to identify hidden patterns and structures in such data is illustrated. In an exemplary embodiment, the method is executable on any networked computer platform, such as, for example, a personal computer (PC).

The method for using machine learning models to automatically cluster data into meaningful populations and groups and to identify hidden patterns and structures in such data may be implemented by an Intelligent Clustering Engine (ICE) device 202. The ICE device 202 may be the same or similar to the computer system 102 as described with respect to FIG. 1. The ICE device 202 may store one or more applications that can include executable instructions that, when executed by the ICE device 202, cause the ICE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ICE device 202 itself, may be located in virtual server(s) running in a cloud-based computing environment rather than being tied to one or more specific physical network computing devices. Also, the application(s) may be running in one or more virtual machines (VMs) executing on the ICE device 202. Additionally, in one or more embodiments of this technology, virtual machine(s) running on the ICE device 202 may be managed or supervised by a hypervisor.

In the network environment 200 of FIG. 2, the ICE device 202 is coupled to a plurality of server devices 204(1)-204(n) that hosts a plurality of databases 206(1)-206(n), and also to a plurality of client devices 208(1)-208(n) via communication network(s) 210. A communication interface of the ICE device 202, such as the network interface 114 of the computer system 102 of FIG. 1, operatively couples and communicates between the ICE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG.

1, although the ICE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ICE devices that efficiently implement a method for using machine learning models to automatically cluster data into meaningful populations and groups and to identify hidden patterns and structures in such data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ICE device 202 may be a standalone device or integrated with one or more other devices or apparatuses, such as one or more of the server devices 204(1)-204(n), for example. In one particular example, the ICE device 202 may include or be hosted by one of the server devices 204(1)-204(n), and other arrangements are also possible. Moreover, one or more of the devices of the ICE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ICE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store entity-specific data and/or client-specific data and data that relates to artificial intelligence (AI) algorithms and machine learning (ML) models.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the ICE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ICE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ICE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ICE device 202, the server devices 204(1)-204(n), or the client devices 208(1)-208(n), for example, may be configured to operate as virtual instances on the same physical machine. In other words, one or more of the ICE device 202, the server devices 204(1)-204(n), or the client devices 208(1)-208(n) may operate on the same physical device rather than as separate devices communicating through communication network(s) 210. Additionally, there may be more or fewer ICE devices 202, server devices 204(1)-204(n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
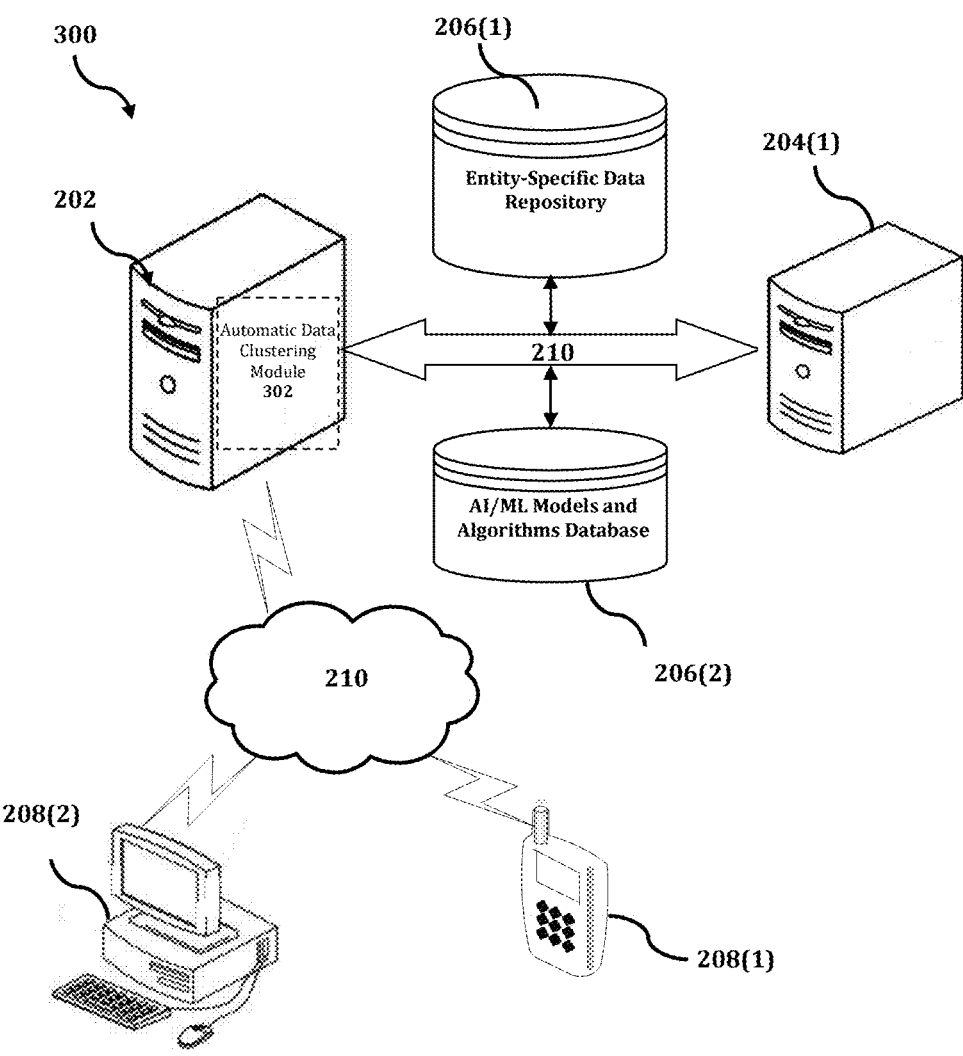
FIG. 3 shows an exemplary system for implementing a method for using an artificial intelligence technique to forecast market activities by specific parties with respect to derivatives and other specific types of financial instruments.

The ICE device 202 is described and illustrated in FIG. 3 as including an automatic data clustering module 302, although it may include other rules, policies, modules, databases, or applications, for example. As will be described below, the automatic data clustering module 302 is configured to implement a method for using machine learning models to automatically cluster data into meaningful populations and groups and to identify hidden patterns and structures in such data. In an exemplary embodiment, one objective of the ICE device 202 and the automatic data clustering module 302 is to automate an end-to-end data science workflow/pipeline for unsupervised learning tasks, also referred to herein as clustering, so that the expertise of a data scientist is not required. In this aspect, the ICE device 202 and the automatic data clustering module 302 are designed to perform work that would typically be expected of a data scientist with respect to clustering problems.

An exemplary process 300 for implementing a mechanism for using machine learning models to automatically cluster data into meaningful populations and groups and to identify hidden patterns and structures in such data by utilizing the network environment of FIG. 2 is illustrated as being executed in FIG. 3. Specifically, a first client device 208(1) and a second client device 208(2) are illustrated as being in communication with ICE device 202. In this regard, the first client device 208(1) and the second client device 208(2) may be "clients" of the ICE device 202 and are described herein as such. Nevertheless, it is to be known and understood that the first client device 208(1) and/or the second client device 208(2) need not necessarily be "clients" of the ICE device 202, or any entity described in association therewith herein. Any additional or alternative relationship may exist between either or both of the first client device 208(1) and the second client device 208(2) and the ICE device 202, or no relationship may exist.

Further, ICE device 202 is illustrated as being able to access an entity-specific data repository 206(1) and an AI/ML models and algorithms database 206(2). The automatic data clustering module 302 may be configured to access these databases for implementing a method for using machine learning models to automatically cluster data into meaningful populations and groups and to identify hidden patterns and structures in such data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ICE device 202 via broadband or cellular communication. Of course, these embodiments are merely exemplary and are not limiting or exhaustive.

Upon being started, the automatic data clustering module 302 executes a process for using machine learning models to automatically cluster data into meaningful populations and groups and to identify hidden patterns and structures in such data. An exemplary process for using machine learning models to automatically cluster data into meaningful populations and groups and to identify hidden patterns and structures in such data is generally indicated at flowchart 400 in FIG. 4.

In process 400 of FIG. 4, at step S402, the automatic data clustering module 302 receives first information that relates to a group of entities and is specific to a particular entity. In an exemplary embodiment, the group of entities may include entities and/or clients that are selected according to predetermined criteria, such as, for example, new clients that have recently begun a commercial relationship with a financial institution; clients that are associated with a particular geographic area; and/or clients that are selected based on any other suitable criterion. However, the invention is not limited to clients, and the group of entities may include any suitable type of entity, such as, for example, an account or a product. In an exemplary embodiment, the first information may include a dataset that is in a comma-separated values (CSV) format. For example, the first information may be received as a Microsoft Excel file.

At step S404, the automatic data clustering module 302 analyzes the entity-specific information with respect to a predetermined set of parameters together with a predetermined parameter range and also with respect to a predetermined set of data types. In an exemplary embodiment, the data types may include any one or more of a numerical data type, an ordinal data type, a nominal data type, a categorical data type, and a textual data type. The analysis may also include preprocessing steps, such as, for example, removing sparsely populated and/or insignificant columns from a spreadsheet; removing extraneous blank spaces and/or special characters; filling in missing values; properly scaling data included in an input file; and detecting outlier data. However, the present invention is not limited to these types of preprocessing steps, and other suitable preprocessing steps may also be performed. The parameters may be inputted and/or read in from a file, and may be based on a range of values. The parameters may be adjusted to optimize a subsequent clustering function.

At step S406, for textual data, the analysis of the entity-specific information may include a sentiment analysis by which at least one of a positive sentiment, a negative sentiment, and a neutral sentiment is assigned to each respective portion of the textual data. When a particular portion of textual data exceeds a predetermined threshold number of characters, such as, for example, 50 characters, the analysis may include a topic modeling operation by which one or more keywords included in the particular portion of textual data is identified. However, the present invention is not limited to these types of operations, and as such, the analysis of the entity-specific information is not limited to sentiment analysis and/or a topic modeling operation, and other types of analysis operations may be performed.

At step S408, the automatic data clustering module 302 selects a particular artificial intelligence (AI)/machine learning (ML) model and/or algorithm from among a predetermined set of AI/ML models/algorithms. In an exemplary embodiment, the predetermined set of AI/ML models/algorithms may include one or more of the following: a first model that implements a hierarchical clustering algorithm; a second model that implements a database scan (DBSCAN) algorithm; a third model that implements a K-means algorithm; and a fourth model that implements a K-prototypes algorithm. However, the present invention is not limited to these types of models, and as such, other suitable AI/ML models may be used. In addition, a model that implements a Latent Dirichlet Allocation (LDA) algorithm may be used for determining a weight distribution of words in text, and as such, this type of model may be used to generate this output as a feature and added to the data set in advance of the clustering operation.

At step S410, the automatic data clustering module 302 uses the selected AI/ML model/algorithm to identify data clusters from within the first information received in step S402, and to generate a report that includes second information that relates to the clusters. In an exemplary embodiment, the selection of the particular AI/ML algorithm is based on a silhouette score that relates to a cluster quality for the clusters that are identified by each candidate AI/ML model/algorithm included in the predetermined set of AI/ML models/algorithms. However, the present invention is not limited to the use of the silhouette score for selecting a particular AI/ML algorithm, and as such, other selection methods may be used. In an exemplary embodiment, the data clusters identified by the selected AI/ML model/algorithm may include any one or more of a first data cluster that relates to clients with a first line of business (LOB), a first industry sector, and relatively low revenue values; a second data cluster that relates to clients with a second LOB, a second industry sector, and mid-range revenue values; and a third data cluster that relates to clients with a third LOB, a third industry sector, and relatively high revenue values. In the report, labels may be appended to the original dataset received in step S402 in order to facilitate user understanding of the data, and features of each cluster may be described for further insight and understanding. After the report is generated, it may be transmitted to particular users and/or posted and/or displayed via a user interface or dashboard.

Accordingly, with this technology, a process for using machine learning models to automatically cluster data into meaningful populations and groups and to identify hidden patterns and structures in such data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for clustering data, the method comprising:

receiving, by at least one processor, first information that relates to a first plurality of entities;

analyzing, by the at least one processor, the first information with respect to a predetermined set of parameters and a predetermined set of data types, comprising:

identifying textual data within the first information;

performing, in response to at least the identified textual data exceeding 50 characters within the first information, a topic modeling operation by which at least one keyword is identified;

performing, for the identified textual data, a sentiment analysis that assigns, for each analyzed portion of the textual data, a determined sentiment including at least one from among a positive sentiment, a negative sentiment, and a neutral sentiment;

selecting, by the at least one processor based on results of the analyzing, a particular machine learning (ML) model from among a predetermined plurality of ML models;

generating, by the at least one processor by using the particular ML model, a first report that includes second information that relates to at least one data cluster identified by the particular ML model from the first information;

wherein the results of the analyzing as used by the selecting includes the determined sentiment and the identified at least one keyword; and wherein the predetermined plurality of ML models comprises a first model that implements a hierarchical clustering algorithm, a second model that implements a database scan (DBSCAN) algorithm, a third model that implements a K-means algorithm, and a fourth model that implements a K-prototypes algorithm.

2. The method of claim 1, wherein the first information comprises a first dataset that is in a comma-separated values (CSV) format.

3. The method of claim 2, wherein the first dataset is received as an input Microsoft Excel file.

4. The method of claim 1, wherein the predetermined set of data types comprises at least one from among a numerical data type, an ordinal data type, a nominal data type, a categorical data type, and a textual data type.

5. The method of claim 1, wherein the at least one data cluster includes at least one from among a first data cluster that relates to a first plurality of clients that is associated with a first line of business (LOB), a first industry sector, and relatively low revenue values; a second data cluster that relates to a second plurality of clients that is associated with a second LOB, a second industry sector, and mid-range revenue values; and a third data cluster that relates to a third plurality of clients that is associated with a third LOB, a third industry sector, and relatively high revenue values.

6. The method of claim 1, wherein the selecting comprises determining, for each respective one from among the predetermined plurality of ML models, a corresponding silhouette score that relates to a respective cluster quality for clusters generated by the respective ML model.

7. The method of claim 1, the analyzing further comprising:
    preprocessing the first information by:
        removing sparsely populated and/or insignificant columns from any identified spreadsheet;
        removing extraneous blank spaces and/or special characters;
        filling in missing values;
        scaling data included in an input file; and
        detecting outlier data.

8. A computing apparatus for clustering data, the computing apparatus comprising:
    a processor;
    a memory; and
    a communication interface coupled to each of the processor and the memory,
    wherein the processor is programmed to cooperate with instructions in memory to perform operations including:
        receive, via the communication interface, first information that relates to a first plurality of entities;
        analyze the first information with respect to a predetermined set of parameters and a predetermined set of data types, comprising:
            identify textual data within the first information;
            perform, in response to at least the identified textual data exceeding 50 characters within the first information, a topic modeling operation by which at least one keyword is identified;
            perform, for the identified textual data, a sentiment analysis that assigns, for each analyzed portion of the textual data, a determined sentiment including at least one from among a positive sentiment, a negative sentiment, and a neutral sentiment;
        select, based on results of the analyze, a particular machine learning (ML) model from among a predetermined plurality of ML models;
        generate, by using the particular ML model, a first report that includes second information that relates to at least one data cluster identified by the particular ML model from the first information;
        wherein the results of the analyzing as used by the selecting includes the determined sentiment and the identified at least one keyword; and
        wherein the predetermined plurality of ML models comprises a first model that implements a hierarchical clustering algorithm, a second model that implements a database scan (DBSCAN) algorithm, a third model that implements a K-means algorithm, and a fourth model that implements a K-prototypes algorithm.

9. The computing apparatus of claim 8, wherein the first information comprises a first dataset that is in a comma-separated values (CSV) format.

10. The computing apparatus of claim 9, wherein the first dataset is received as an input Microsoft Excel file.

11. The computing apparatus of claim 8, wherein the predetermined set of data types comprises at least one from among a numerical data type, an ordinal data type, a nominal data type, a categorical data type, and a textual data type.

12. The computing apparatus of claim 8, wherein the at least one data cluster includes at least one from among a first data cluster that relates to a first plurality of clients that is associated with a first line of business (LOB), a first industry sector, and relatively low revenue values; a second data cluster that relates to a second plurality of clients that is associated with a second LOB, a second industry sector, and mid-range revenue values; and a third data cluster that relates to a third plurality of clients that is associated with a third LOB, a third industry sector, and relatively high revenue values.

13. The computing apparatus of claim 8, wherein the processor is further configured to make the selection by determining, for each respective one from among the predetermined plurality of ML models, a corresponding silhouette score that relates to a respective cluster quality for clusters generated by the respective ML model.

14. The computing apparatus of claim 8, the analyze further comprising:
    preprocess the first information by:
        remove sparsely populated and/or insignificant columns from any identified spreadsheet;
        remove extraneous blank spaces and/or special characters;
        fill in missing values;
        scaling data included in an input file; and
        detect outlier data.

15. A non-transitory computer readable storage medium storing instructions for clustering data, the storage medium comprising a second set of executable code which, when executed by a processor, causes the processor to perform operations comprising:
    receive first information that relates to a first plurality of entities;
    analyze the first information with respect to a predetermined set of parameters and a predetermined set of data types, comprising:
        identify textual data within the first information;
        perform, in response to at least the identified textual data exceeding 50 characters within the first information, a topic modeling operation by which at least one keyword is identified;
        perform, for the identified textual data, a sentiment analysis that assigns, for each analyzed portion of the textual data, a determined sentiment including at least one from among a positive sentiment, a negative sentiment, and a neutral sentiment;
    select, based on results of the analysis, a particular machine learning (ML) model from among a predetermined plurality of ML models;
    generate, by using the particular ML model, a first report that includes second information that relates to at least one data cluster identified by the particular ML model from the first information;
    wherein the results of the analyzing as used by the selecting includes the determined sentiment and the identified at least one keyword; and
    wherein the predetermined plurality of ML models comprises a first model that implements a hierarchical clustering algorithm, a second model that implements a database scan (DBSCAN) algorithm, a third model that implements a K-means algorithm, and a fourth model that implements a K-prototypes algorithm.

* * * * *